US012624795B2

(12) United States Patent
Chumakov et al.

(10) Patent No.: US 12,624,795 B2
(45) Date of Patent: May 12, 2026

(54) HYDROGEN GAS STORAGE TANKS WITH GRAPHYNE-CONTAINING LAYERS

(71) Applicant: Robert Bosch GmbH, Stuttgart (DE)

(72) Inventors: Sergei Chumakov, Palo Alto, CA (US); Daniil Kitchaev, Brookline, MA (US)

(73) Assignee: Robert Bosch GmbH, Stuttgart (DE)

( * ) Notice: Subject to any disclaimer, the term of this patent is extended or adjusted under 35 U.S.C. 154(b) by 125 days.

(21) Appl. No.: 18/401,010

(22) Filed: Dec. 29, 2023

(65) Prior Publication Data

US 2025/0216028 A1 Jul. 3, 2025

(51) Int. Cl.
*F17C 1/10* (2006.01)

(52) U.S. Cl.
CPC ........ *F17C 1/10* (2013.01); *F17C 2203/0607* (2013.01); *F17C 2203/0634* (2013.01)

(58) Field of Classification Search
CPC ................ F17C 1/10; F17C 2203/0607; F17C 2203/0634; Y02E 60/32
USPC ........................................................ 508/109
See application file for complete search history.

(56) References Cited

U.S. PATENT DOCUMENTS

2018/0149312 A1* 5/2018 Criel ......................... F17C 1/02

FOREIGN PATENT DOCUMENTS

KR 20150039226 A * 4/2015 ........... C01B 3/0021

* cited by examiner

*Primary Examiner* — Prem C Singh
*Assistant Examiner* — Francis C Campanell
(74) *Attorney, Agent, or Firm* — Brooks Kushman P.C.

(57) ABSTRACT

A hydrogen gas storage tank includes a body including a metallic bulk region and one or more protective layers adjacent to the bulk region. One or more of these protective layers comprise a number of graphyne molecules such that the one or more protective layers are configured to lower hydrogen adsorption into the bulk region when compared to a bulk region with protective layers free from graphyne.

20 Claims, 4 Drawing Sheets

α-graphyne

β-graphyne

γ-graphyne

Graphdiyne 6,6,12-graphyne

HYDROGEN GAS STORAGE TANKS WITH GRAPHYNE-CONTAINING LAYERS

TECHNICAL FIELD

The present disclosure relates to hydrogen gas ($H_2$) storage tanks with graphyne-containing layers.

BACKGROUND

Hydrogen gas is a viable contender for zero or relatively low emission fuel economy both in fuel cell vehicles (FCVs) and stationary applications. But storage of hydrogen gas remains a challenge from perspectives of safety and materials science. While certain metals such as stainless steel seem like the ideal candidate for tank material due to their low cost, these materials suffer from hydrogen-induced embrittlement which is caused by hydrogen dissociation and adsorption. Thus, there has been a long-term need for hydrogen barrier that would prevent hydrogen from reaching the tank material and thus making cheap and robust materials such as steel applicable to pressurized storage tank applications while meeting and/or exceeding industry standards for safety and durability.

SUMMARY

In one embodiment, a hydrogen gas storage tank includes a body including a metallic bulk region and one or more protective layers adjacent to the bulk region. One or more of these protective layers comprise a number of graphyne molecules such that the one or more protective layers are configured to lower hydrogen adsorption into the bulk region when compared to a bulk region with protective layers free from graphyne.

In another embodiment, a hydrogen gas apparatus is disclosed. The hydrogen gas apparatus includes a body including a bulk region, and one or more protective layers adjacent to the bulk region, wherein the one or more protective layers contain a number of graphyne molecules, such that the one or more protective layers are configured to lower hydrogen adsorption into the bulk region when compared to a bulk region free from the protective layers.

In yet another embodiment, a hydrogen gas apparatus is disclosed. The hydrogen gas apparatus includes a body including a bulk region, and one or more protective layers adjacent to the bulk region, wherein the one or more protective layers contain a graphdiyne material, such that the one or more protective layers are configured to lower hydrogen adsorption into the bulk region when compared to a bulk region free from the protective layers.

DETAILED DESCRIPTION

Figure 1:
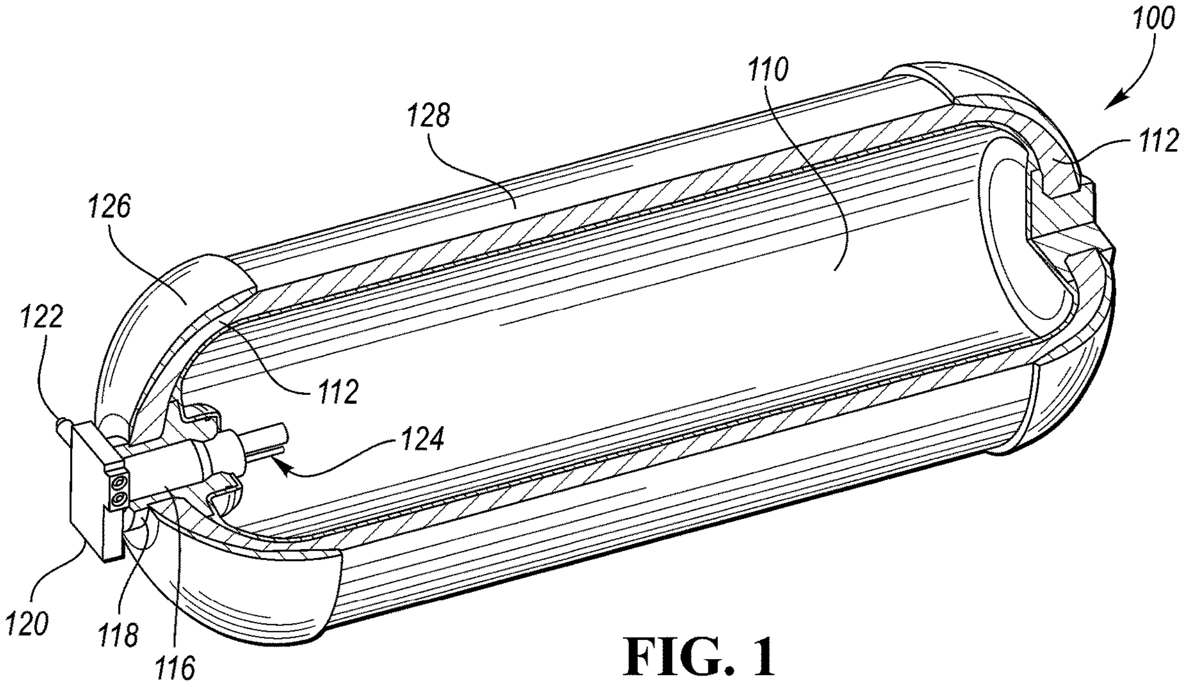
FIG. 1 depicts a schematic perspective view of a pressurized hydrogen gas storage tank according to one or more embodiments.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5%, or 10% of the value or relative characteristic.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Fuel cell vehicles (FCVs) have become increasingly popular, and automakers are expanding their FCV fleets to serve the demand for relatively low or zero emission technologies. FCVs are a type of electric vehicles which use a fuel cell to generate electricity to power their motors, generally using oxygen from the air and compressed hydrogen. But FCVs face challenges which present opportunities for improvement of the FCV technology.

One of the challenges is providing a relatively low-cost on-board hydrogen gas storage that is safe, lightweight, and durable. Hydrogen gas may be stored in various materials or in a physical storage such as a hydrogen tank, canister, or a cartridge. A non-limiting example of a hydrogen gas storage tank is shown in FIG. 1. The $H_2$ storage tank 100 is typically a cylindrical hollow pressure vessel including an elongated body 110, a first and second end forming a dome 112, 114, and an opening 116 for uptake and/or release of the hydrogen gas. The opening 116 includes a boss 118, a manual or electrical valve or a regulator 120, a thermally activated pressure relief device 122, and one or more temperature sensors 124. The domes 112, 114 typically include a reinforced external protective layer serving as the dome protection 126, which is impact-resistant and capable of keeping $H_2$ under a standard pressure for the storage of gaseous hydrogen in a vehicle which is currently set at 70 MPa (700 bar).

The body 110 may include one or more layers 128 made from one or more materials. The materials should be lightweight and corrosion-, fatigue-, creep-, and/or relaxation-resistant. The one or more layers 128 typically include an aluminum-alloy layer lined internally with plastic lining and an external protective layer of carbon fiber-reinforced plastics with an additional shock-absorbing protective layer of fiber glass/aramid material on the outside. The industry has set a target of a 110 kg, 70 MPa cylinder with a gravimetric storage density of 6 mass % and a volumetric storage density of 30 kg $m^{-3}$ for the on-board hydrogen gas storage tanks.

Hydrogen gas may also be stored in stationary high pressure gaseous hydrogen (HPGH2) storage vessels, mostly used to store $H_2$ in hydrogen refueling stations. Typically, a stationary HPGH2 includes seamless hydrogen storage vessel made from high strength material.

The material of choice for hydrogen storage tanks has thus been a variety of aluminum or copper alloys, high strength or stainless steel, or carbon steel. A steel tank may be one of the most economical, practical, and viable solutions for storing hydrogen gas; however, the adsorption of hydrogen atoms and/or molecules by the metal may lead to hydrogen-induced metal embrittlement, causing ductility loss (reduction of elongation on fracture) even at stresses less than the tensile strength of the metal, possibly even at room temperature. Since safety is a very important criterion for designing a $H_2$ storage tank, reducing hydrogen adsorption, metal embrittlement, and/or ductility loss is beneficial. It would thus be desirable to identify and develop a metallic material highly suitable for hydrogen gas storage on-board and stationary applications which would mitigate or remove one or more of the drawbacks described above.

Another way to approach the problem of longevity of hydrogen storage that is primarily made of metals is to shield these metals from hydrogen adsorption by applying various coatings to the inside of the tank. What are needed are coatings configured to reduce or completely prevent hydrogen gas from passing through them. In one or more embodiments, graphyne-based materials are used as coating in hydrogen storage tanks to resist hydrogen gas leakage.

There are various hybridization states (sp, $sp^2$, $sp^3$) of carbon that allow diverse covalent bonding between carbon atoms and result in numerous carbon allotropes. For example, the two most stable natural carbon allotropes are graphite and diamond, which have $sp^2$ and $sp^3$ hybridization characters, respectively. Graphynes are a family of carbon allotropes that have one-atom-thickness and sp and $sp^2$ carbon atoms. Graphynes can be constructed by either partially or completely replacing the C—C bonds in graphene with one or more acetylenic groups —C≡C—. Schematic of a molecular structure of several graphynes are shown in the FIG. 3.

Figure 4A:
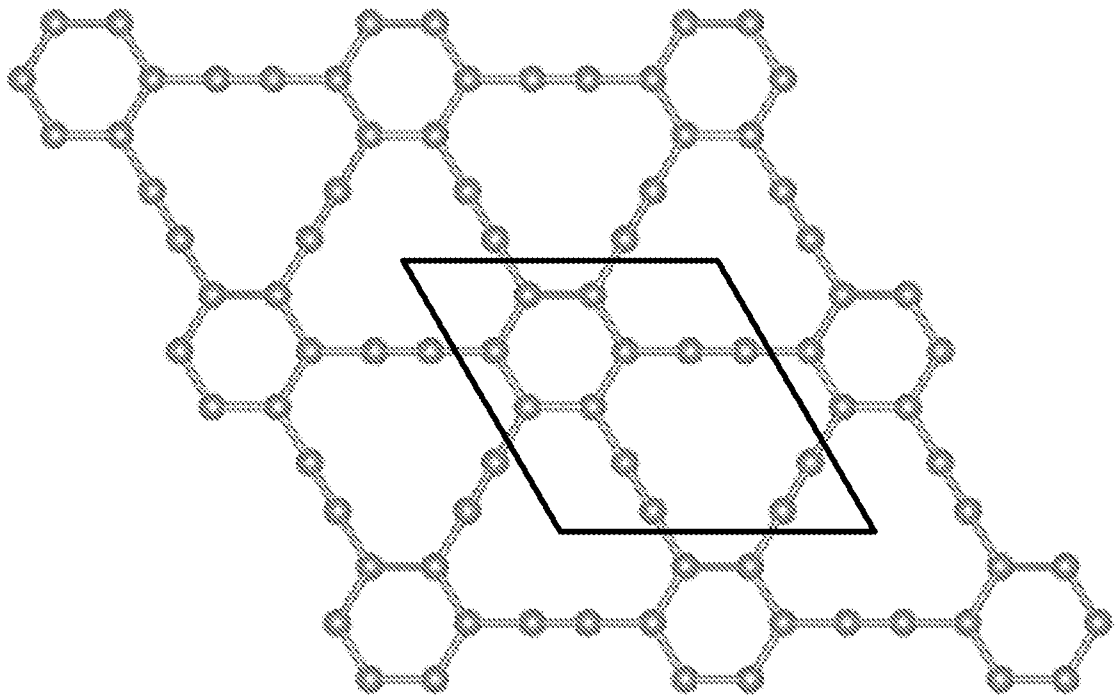
FIG. 4A is a 2D chemical structure illustration of a part of a single molecule of gamma-graphyne.
Figure 4B:
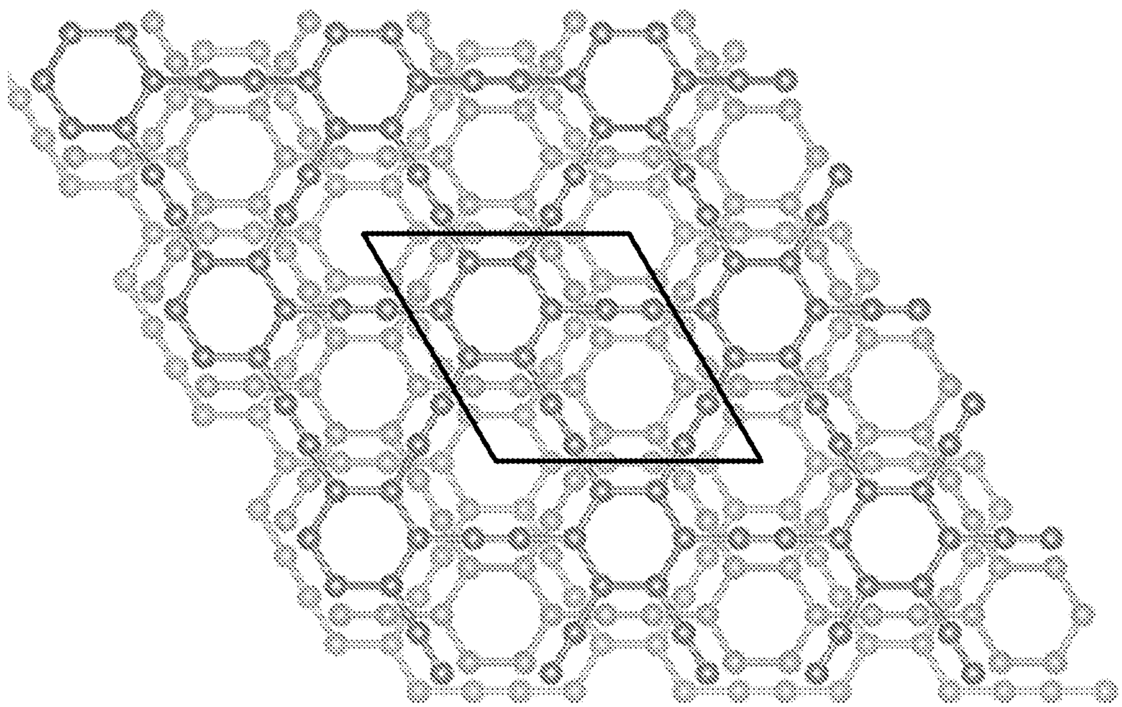
FIG. 4B is a 2D chemical structure illustration of three layers of gamma-graphyne stacked in ABC-stacking.

In one or more embodiments, the graphyne-based material exists in a stable form of a single infinitely large 2D molecule. These graphynes may be used in coatings to resist hydrogen gas leakage from hydrogen storage tanks. FIG. 4A depicts a single-layer molecule of gamma-graphyne. The gamma-graphyne may tend to form flakes that have thickness of several layers (e.g., three layers of graphyne molecules). In one or more embodiments, the preferred stacking of these three layers is called "ABC-stacking" and is shown in the FIG. 4B.

Figure 5A:
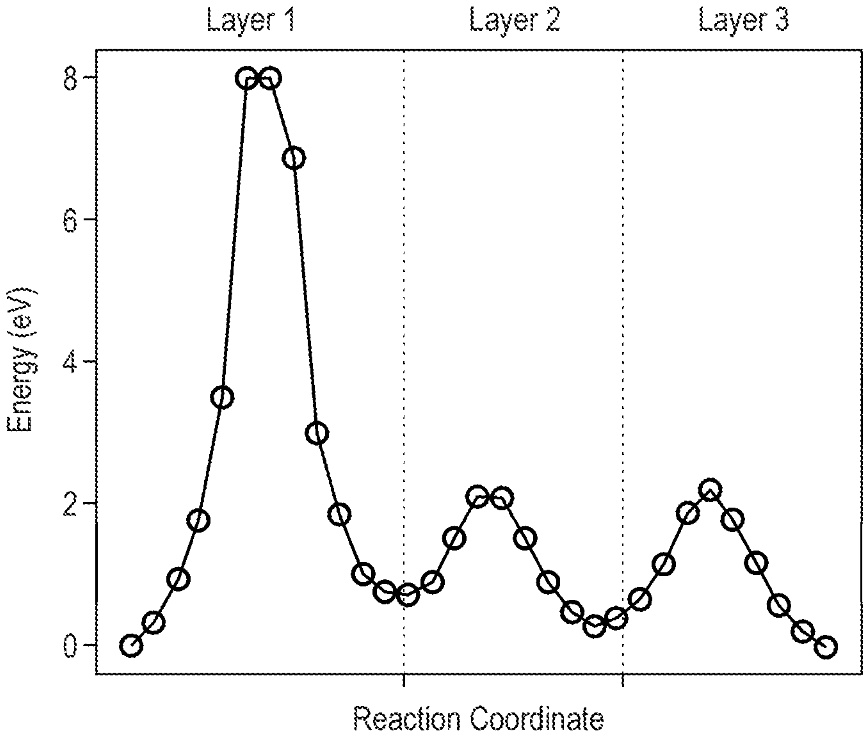
FIG. 5A is a graphical representation of energy with respect to reaction coordinates illustrating the energy required to hold a molecule of hydrogen gas at various locations along the line perpendicular to the plane of ABC-stacked gamma-graphyne.
Figure 5B:
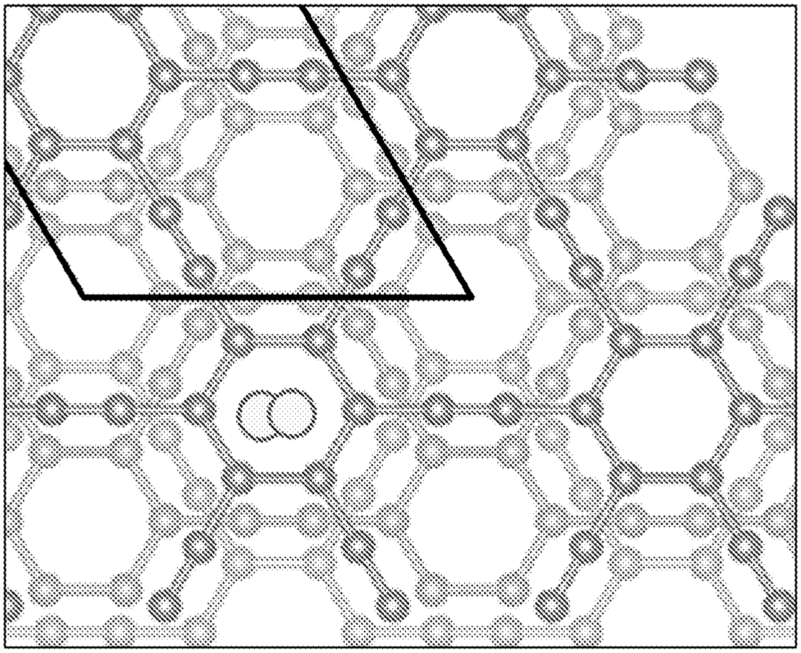
FIG. 5B is a 2D chemical structure illustration of three layers of gamma-graphyne stacked in ABC-stacking illustrating a location a hydrogen molecule may passes through one of the benzene rings.

The ability of gamma-graphyne to resist (e.g., prevent) hydrogen molecules from passing through have been verified computationally by using a computer program that employs Density Function Theory (DFT). FIG. 5A shows results of DFT-based calculations which show energy levels that are required to keep a molecule of hydrogen in a sequence of positions along the line that is perpendicular to the ABC-stacked graphyne and passes through one of benzene rings. FIG. 5B shows the view of ABC-stacked graphyne layer with a hydrogen molecule. From the calculations it is evident that the minimum energy required for the hydrogen molecule to pass through a large hole in a single layer of gamma-graphyne equals to 2 eV. This shows that a single-molecule layer of gamma-graphyne is impenetrable to hydrogen under projected conditions. Under the assumption that gamma-graphyne forms a three-layer configuration with ABC-stacking, the hydrogen molecule would have to pass through one of benzene rings to cross all three graphyne layers. Thus, the minimum energy of hydrogen molecule required to cross all three layers of gamma-graphyne is close to 8 eV, which is unachievable under projected conditions. In one or more embodiments, projected conditions are pressure of 700 bar, temperature less than 200 C, and concentration of hydrogen is 100%.

In one or more embodiments, a hydrogen storage tank with one or more graphyne-containing layers is disclosed. The tank may have similar dimensions, configuration, parts, and shape as tank 100 depicted in FIG. 1. The tank may be any pressurized vessel or canister capable of safely holding hydrogen gas. The tank may have such dimensions and properties as to pass safety and other industry requirements for hydrogen gas storage tanks. The tank may be an on-board hydrogen gas storage tank or a stationary hydrogen gas storage tank. The tank may be cylindrical, polymorph, toroid, or have another suitable shape. The tank's capacity may vary from about 1 to a few thousand liters. The tank may be able to store different mass of hydrogen such as about 1-30, 2-20, or 3-10 kg, or any number in-between the mentioned range such as 1, 2, 3, 4, 5, 6, 7, 8, 9, 10 kg, or higher, at high pressure such as 200-1500, 300-1000, or 400-800 bar. The tank's body 200, schematically depicted in FIGS. 2 and 3, may include steel or other materials.

Figure 2A:
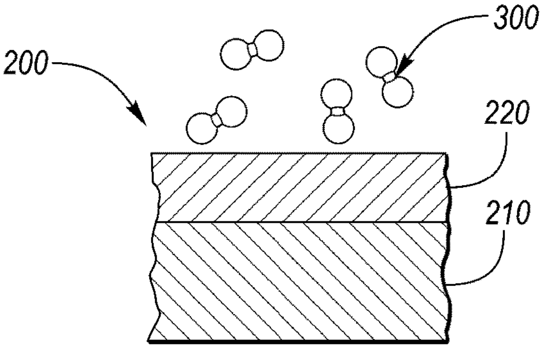
FIGS. 2A and 2B show schematic views of a steel bulk region of the hydrogen gas storage tank with a graphyne-containing protective layer, or several protective layers, some of which can contain graphyne.
Figure 2B:
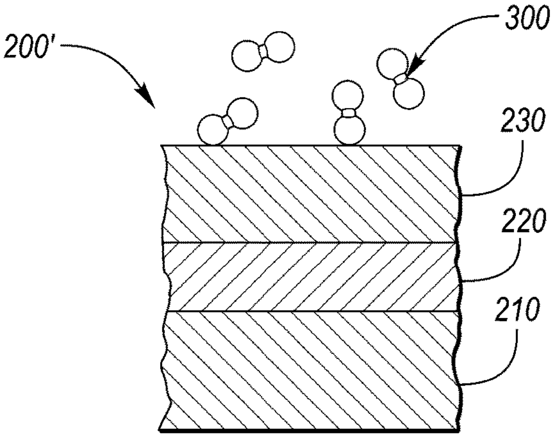

The tank may include one or more graphyne-containing layers 220, among other layers, adjacent to the bulk material region 210 as is depicted in FIGS. 2A and 2B. The graphyne-containing layer(s) 220 may include one or more graphyne molecules having such morphology that the graphyne-containing layer(s) 220 are configured to minimize and suppress hydrogen binding, adsorption, and/or dissociation reactions, slow down corrosion of the tank, or a combination thereof.

One or more embodiments disclose one or more graphyne-based (e.g., graphyne or doped graphyne) coating layers and their fabrication and integration upon the surface of hydrogen storage tanks. In one embodiment, the graphyne-based coating includes layers of graphyne-based material. The graphyne-based material may be a graphyne material, a doped graphyne or graphyne oxide material, or a combination thereof. For instance, the graphyne-based material may be a graphdiyne material subjected to heteroatom doping (e.g., Ca, N, S, F, and/or Cl). As another example, the graphyne-based material may be a graphdiyne material doped with one or more transitional metals (e.g., Cu, Pd, Ni, and/or Fe).

Although FIG. 1 depicts a hydrogen gas storage tank, this application can also be applied to other apparatus used in the containment and channeling of hydrogen gas, including a tank, a canister, a pressurized vessel, a pipe, a seal, a valve, or a fitting.

There are various hybridization states (sp, $sp^2$, $sp^3$) of carbon that allow diverse covalent bonding between carbon atoms and result in numerous carbon allotropes. For example, the two most stable natural carbon allotropes are graphite and diamond, which have $sp^2$ and $sp^3$ hybridization characters, respectively. Graphynes are a family of carbon allotropes that have one-atom-thickness and sp and $sp^2$ carbon atoms. Graphynes can be constructed by either partially or completely replacing the C—C bonds in graphene with one or more acetylenic groups —C≡C—. Schematic of a molecular structure of several graphynes are shown in the FIG. 5.

Figure 3A:
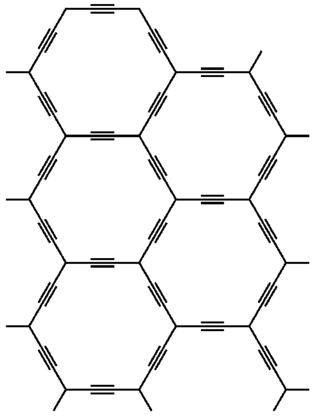
FIGS. 3A through 3E present examples of graphyne-based materials: α-graphyne (FIG. 3A), β-graphyne (FIG. 3B), γ-graphyne (FIG. 3C), graphdiyne (FIG. 3D) and 6,6,12-graphyne (FIG. 3E).
Figure 3B:
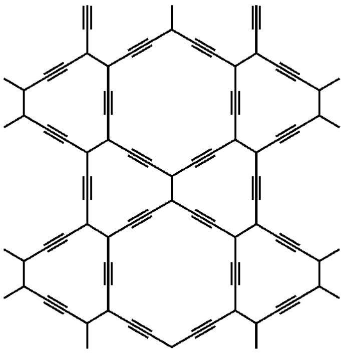
Figure 3C:
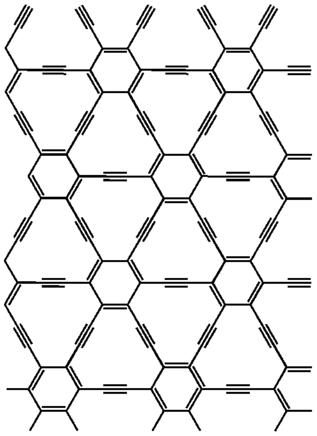
Figure 3D:
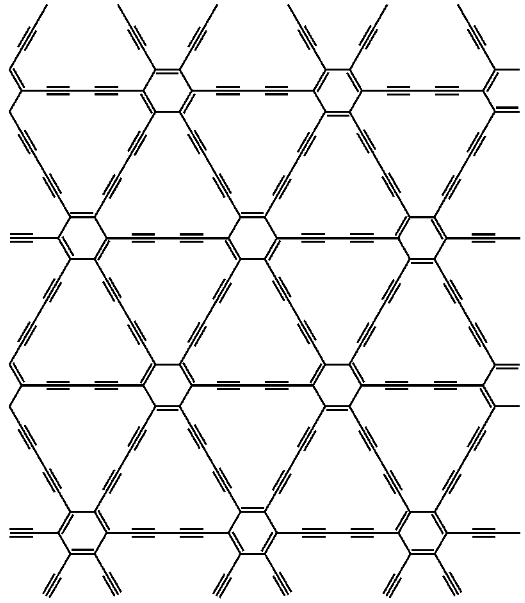
Figure 3E:
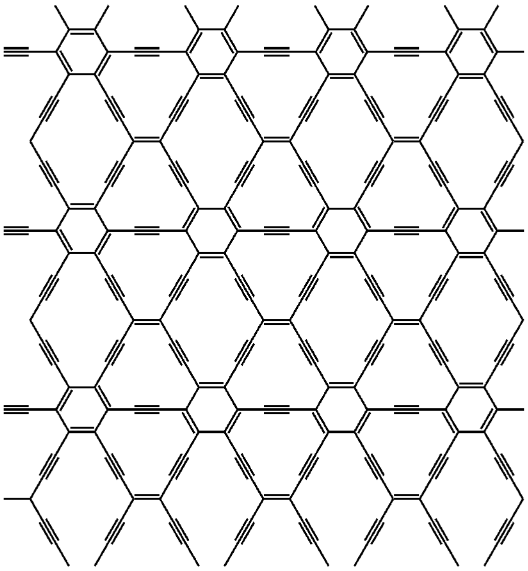

FIGS. 3A through 3E present examples of graphyne-based materials: α-graphyne (FIG. 3A), β-graphyne (FIG. 3B), γ-graphyne (FIG. 3C), graphdiyne (FIG. 3D) and 6,6,12-graphyne (FIG. 3E). In one or more embodiments, graphdiyne may be manufactured using a bulk synthesis method (e.g., copper foil method, diatomite substrate, explosion method, and/or controlled release method) or a thin film synthesis (e.g., about nanometer thickness). Non-limiting examples of thin film analysis include interface between liquids, Si substrate, microwave-induced method, and peeling in aqueous solution of $Li_2SiF_6$.

Graphynes may exist stably in form of a single infinitely large 2D molecule. These graphynes may be used in coatings to resist hydrogen gas leakage from hydrogen storage tanks. FIG. 4A depicts a single-layer molecule of gamma-graphyne. The gamma-graphyne may tend to form flakes that have thickness of several layers (e.g., three layers of graphyne molecules). In one or more embodiments, the preferred stacking of these three layers is called "ABC-stacking" and is shown in the FIG. 4B.

The ability of gamma-graphyne to resist (e.g., prevent) hydrogen molecules from passing through have been verified computationally by using a computer program that employs Density Function Theory (DFT). FIG. 5A shows results of DFT-based calculations which show energy levels that are required to keep a molecule of hydrogen in a sequence of positions along the line that is perpendicular to the ABC-stacked graphyne and passes through one of benzene rings. FIG. 5B shows the view of ABC-stacked graphyne layer with a hydrogen molecule. From the calculations it is evident that the minimum energy required for the hydrogen molecule to pass through a large hole in a single layer of gamma-graphyne equals to 2 eV. This shows that a single-molecule layer of gamma-graphyne is impenetrable to hydrogen under projected conditions. Under the assumption that gamma-graphyne forms a three-layer configuration with ABC-stacking, the hydrogen molecule would have to pass through one of benzene rings to cross all three graphyne layers. Thus, the minimum energy of hydrogen molecule required to cross all three layers of gamma-graphyne is close to 8 eV, which is unachievable under projected conditions. In one or more embodiments, projected conditions are pressure of 700 bar, temperature less than 200 C, and concentration of hydrogen is 100%.

One or more embodiments disclose one or more graphyne-based (e.g., graphyne or doped graphyne) coating layers and their fabrication and integration upon the surface of bipolar plate. In one embodiment, the graphyne-based coating includes layers of graphyne-based material. The graphyne-based material may be a graphyne material, a doped graphyne or graphyne oxide material, or a combination thereof. For instance, the graphyne-based material may be a graphdiyne material subjected to heteroatom doping (e.g., Ca, N, S, F, and/or Cl). As another example, the graphyne-based material may be a graphdiyne material doped with one or more transitional metals (e.g., Cu, Pd, Ni, and/or Fe).

The following applications are related to the present application: U.S. patent application Ser. No. 18/401,024, U.S. Pat. Appl. Ser. No. 63/616,331, U.S. patent application Ser. No. 18/401,050, and U.S. patent application Ser. No. 18/401,239, which are each incorporated by reference in their entirely herein.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A hydrogen gas tank comprising:

a body including a bulk region; and one or more protective layers adjacent to the bulk region, wherein the one or more protective layers contain gamma-graphyne molecules arranged in a 3-layer ABC stacking configuration, such that the one or more protective layers are configured to lower hydrogen adsorption into the bulk region when compared to a bulk region free from the protective layers.

2. The hydrogen tank of claim 1, wherein the bulk region includes a metal and/or a metal alloy.

3. The hydrogen gas tank of claim 1, wherein the bulk region includes a plastic.

4. The hydrogen gas tank of claim 1, wherein the bulk region includes carbon fiber.

5. The hydrogen gas tank of claim 1, wherein the one or more protective layers include a binder material.

6. The hydrogen gas tank of claim 1, wherein the one or more protective layers is a single protective layer.

7. The hydrogen gas tank of claim 6, wherein a total thickness of the one or more protective layers form a thin film of 0.6 nanometers to 5 millimeters.

8. A hydrogen gas apparatus comprising:

a body including a bulk region; and one or more protective layers adjacent to the bulk region, wherein the one or more protective layers contain gamma-graphyne molecules arranged in a 3-layer ABC stacking configuration and graphene flakes, such that the one or more protective layers are configured to lower hydrogen adsorption into the bulk region when compared to a bulk region free from the protective layers.

9. The hydrogen gas apparatus of claim 8, wherein the bulk region includes a metal and/or a metal alloy.

10. The hydrogen gas apparatus of claim 9, wherein at least some of the graphyne flakes are overlapping.

11. The hydrogen gas apparatus of claim 8, wherein the bulk region includes.

12. The hydrogen gas apparatus of claim 8, wherein the apparatus is a tank, a canister, a pressurized vessel, a pipe, a seal, or a fitting.

13. The hydrogen gas apparatus of claim 8, wherein the one or more protective layers comprise a binder material.

14. The hydrogen gas apparatus of claim 8, wherein the one or more protective layers is a single protective layer.

15. The hydrogen gas apparatus of claim 13, wherein a total thickness of the one or more protective layers form a thin film of 0.6 nanometers to 5 millimeters.

16. A hydrogen gas apparatus comprising:

a body including a bulk region; and one or more protective layers adjacent to the bulk region, wherein the one or more protective layers contain a graphdiyne material, such that the one or more protective layers are configured to lower hydrogen adsorption into the bulk region when compared to a bulk region free from the protective layers.

17. The hydrogen gas apparatus of claim 16, wherein the graphdiyne material includes a calcium-doped graphdiyne material.

18. The hydrogen gas apparatus of claim 16, wherein the graphdiyne material includes a heteroatom-doped graphdiyne material.

19. The hydrogen gas apparatus of claim 16, wherein the heteroatom-doped graphdiyne material is doped with N, S, F, and/or Cl.

20. The hydrogen gas apparatus of claim 16, wherein a total thickness of the one or more protective layers form a thin film of 0.6 nanometers to 5 millimeters.

* * * * *